UNITED STATES PATENT OFFICE.

BERNHARD HEYMANN, OF ELBERFELD, GERMANY, ASSIGNOR TO THE FARBENFABRIKEN, VORMALS FR. BAYER & CO., OF SAME PLACE.

BLUE DYE.

SPECIFICATION forming part of Letters Patent No. 524,322, dated August 14, 1894.

Application filed April 29, 1893. Serial No. 472,397. (Specimens.)

*To all whom it may concern:*

Be it known that I, BERNHARD HEYMANN, doctor of philosophy, and assignor to the FARBENFABRIKEN, VORMALS FR. BAYER & CO., of Elberfeld, a subject of the Emperor of Germany, residing at Elberfeld, Germany, have invented a new and useful Improvement in the Manufacture of Blue Coloring-Matter, of which I give in the following a clear and exact description.

My invention relates to the production of coloring-matters dyeing cotton and wool with the aid of mordants and resulting from the action of nitroso compounds of tertiary amines on beta naphthoquinone sulfo acid (1:2:6) or (1:2:7) in the presence of sodium thiosulfate. The above naphthoquinone sulfo acids can be replaced by the corresponding nitrosonaphtholsulfo acids (1:2:6 or 1:2:7) which commonly are employed as original substances for the production of the said naphthoquinone sulfo acids.

In carrying out my invention, I proceed as follows, (without limiting myself to these particulars:) 1.86 kilos, by weight, of nitrosodimethylanilin hydrochlorate are dissolved in one hundred liters of water heated at about 60° to 80° centigrade with the addition of 3.6 kilos, by weight, of diluted acetic acid (containing thirty three per cent. of pure acetic acid); then 4.92 kilos, by weight, of sodium thiosulfate dissolved in ten kilos, by weight, of water are added, and the thus obtained reaction mixture is heated at about 80° centigrade, till the whole nitroso compound has entered into reaction; 2.76 kilos, by weight, of the potassium salt of beta naphthoquinone sulfo acid (1:2:6) are mixed with the above solution. On continuous stirring and heating at the above mentioned temperature the dye-stuff begins after some time to separate in bright crystals. It is purified by filtering and washing and is then dried.

The same coloring-matter is obtained, if instead of the above 2.76 kilos, by weight, of the potassium salt of beta naphthoquinone-sulfo acid, the corresponding quantity of nitrosonaphtholsulfoacid 1:2:6, or a salt thereof is employed.

The dry coloring-matter forms a brown powder with a bronze luster. According to my researches it has probably the following formula:

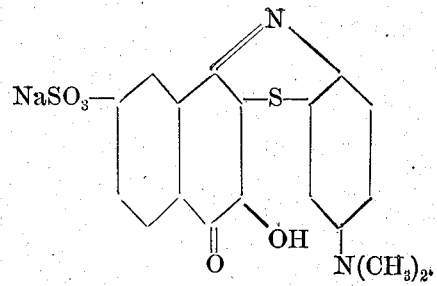

It dissolves in cold water with difficulty, more easily in hot water, especially in the presence of acetic acid, with a blue color. It is almost insoluble in alcohol and concentrated soda-lye. Ammonia and diluted soda-lye form a blue solution. Concentrated mineral acids as for example sulfuric acid (66° Baumé) and hydrochloric acid (20° Baumé) dissolve it with a green color turning into blue on the addition of ice water and then the free sulfo acid separates in the form of blue flakes. The same precipitate is formed, when the hot watery solution of the new dye-stuff is mixed with diluted hydrochloric or sulfuric acid. It dyes wool and cotton mordanted with chromium salts in beautiful blue shades fast to light and milling.

If in the above example instead of nitrosodimethylanilin nitrosodiethylanilin is employed, a similar dye-stuff with the same properties is obtained. A similar product also is obtained, if instead of the used beta naphthoquinonesulfo acid 1:2:6 or of the nitrosonaphtholsulfo acid 1:2:6 the isomeric beta naphthoquinonesulfo acid 1:2:7 or nitroso-naphtholsulfo acid 1:2:7 is employed.

Having thus described the nature of my invention and in what manner the same is to be performed, what I claim as new, and desire to secure by Letters Patent, is—

1. The process for the production of blue coloring matters resulting from the reaction of nitrosodimethylanilin or nitrosodiethylanilin with beta naphthoquinonesulfo acid (1:2:6 or 1:2:7) or with the corresponding nitrosonaphtholsulfo acids (1:2:6 or 1:2:7) in the presence of sodium thiosulfate, substantially as hereinbefore described.

2. As a new article of manufacture the blue coloring-matter having probably the following typical formula:

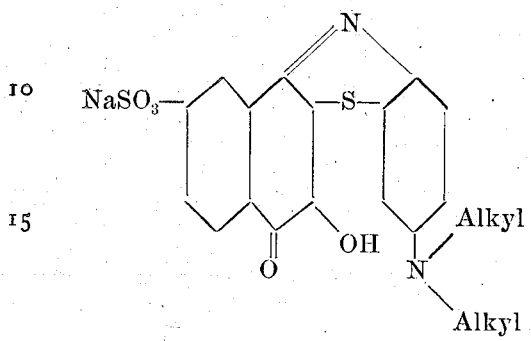

which coloring matter is soluble in cold water with difficulty and more easily in hot water, especially if acidulated with acetic acid; the watery solutions of which separate a blue precipitate on adding diluted mineral acids, soluble in concentrated sulfuric acid (66° Baumé) and hydrochloric acid (20° Baumé) with a green color turning into blue at first on adding ice water, then blue flakes being separated, producing on wool and cotton mordanted with chromium salts bright blue shades fast to light and milling.

In testimony whereof I have signed my name in the presence of two subscribing witnesses.

BERNHARD HEYMANN.

Witnesses:
WILLIAM ESSENWEIN,
RUDOLPH FRICKE.